(12) United States Patent
Iwamoto et al.

(10) Patent No.: US 7,941,864 B2
(45) Date of Patent: May 10, 2011

(54) AUDIO-VIDEO OUTPUT APPARATUS, AUTHENTICATION PROCESSING METHOD, AND AUDIO-VIDEO PROCESSING SYSTEM

(75) Inventors: Kiyotaka Iwamoto, Kyoto (JP); Isamu Ishimura, Kyoto (JP)

(73) Assignee: PANASONIC Corporation, Osaka (JP)

( * ) Notice: Subject to any disclaimer, the term of this patent is extended or adjusted under 35 U.S.C. 154(b) by 766 days.

(21) Appl. No.: 11/942,914

(22) Filed: Nov. 20, 2007

(65) Prior Publication Data

US 2008/0127312 A1 May 29, 2008

(30) Foreign Application Priority Data

Nov. 24, 2006 (JP) ................. 2006-316938

(51) Int. Cl.
*H04L 9/00* (2006.01)
(52) U.S. Cl. .......................................... 726/29
(58) Field of Classification Search ............... 726/4, 17, 726/18, 21, 28, 29; 713/167, 168
See application file for complete search history.

(56) References Cited

U.S. PATENT DOCUMENTS

| | | | |
|---|---|---|---|
| 6,999,587 B1 * | 2/2006 | Asano et al. .................. 380/202 |
| 7,106,861 B1 | 9/2006 | Nishimura et al. |
| 7,512,607 B2 * | 3/2009 | Nagano et al. ........................ 1/1 |
| 2002/0120847 A1 * | 8/2002 | Kamperman ................. 713/170 |
| 2004/0078599 A1 * | 4/2004 | Nahum ........................ 713/201 |
| 2004/0123127 A1 * | 6/2004 | Teicher et al. ................ 713/193 |
| 2005/0021942 A1 * | 1/2005 | Diehl et al. ................... 713/158 |
| 2007/0027817 A1 * | 2/2007 | Hirota et al. .................... 705/65 |
| 2007/0206119 A1 | 9/2007 | Matsui et al. |
| 2007/0208939 A1 | 9/2007 | Iwamoto et al. |
| 2007/0226782 A1 * | 9/2007 | Sato et al. .......................... 726/4 |

OTHER PUBLICATIONS

"High-bandwidth Digital Content Protection System, Revision 1.2," Digital Content Protection LLC, Jun. 13, 2006, [online] URL:http://www.digital-cp.com/home.

* cited by examiner

*Primary Examiner* — Beemnet W Dada
(74) *Attorney, Agent, or Firm* — Greenblum & Bernstein, P.L.C.

(57) ABSTRACT

An audio-video output apparatus of the present invention outputs at least one of audio data and video data to a receiving apparatus using High-Definition Multimedia Interface (HDMI) communications. The audio-video output apparatus includes a list holding unit, an authenticating unit, a list acquiring unit, an updating unit, and an apparatus verifying unit. The list holding unit holds an unauthorized apparatus list which shows information about unauthorized apparatuses. The authenticating unit performs first apparatus authentication to verify whether or not the receiving apparatus is an authorized apparatus using the unauthorized apparatus list held by the list holding unit, and performs second apparatus authentication at regular intervals to verify the receiving apparatus is an authorized apparatus. The list acquiring unit acquires another unauthorized apparatus list. When the unauthorized apparatus list acquired by the list acquiring unit is newer than the unauthorized apparatus list held by the list holding unit, the updating unit updates the unauthorized apparatus list held by the list holding unit to the unauthorized apparatus list acquired by the list acquiring unit. When the unauthorized apparatus list is updated by the updating unit, the apparatus verifying unit verifies whether or not the receiving apparatus is an authorized apparatus using the updated unauthorized apparatus list, the verification being performed in parallel with the second apparatus authentication performed by the authenticating unit.

13 Claims, 10 Drawing Sheets

AUDIO-VIDEO OUTPUT APPARATUS, AUTHENTICATION PROCESSING METHOD, AND AUDIO-VIDEO PROCESSING SYSTEM

BACKGROUND OF THE INVENTION (1) Field of the Invention

The present invention relates to an audio-video output apparatus, an authentication processing method, and an audio-video processing system, and particularly to an audio-video output apparatus which outputs at least one of audio data and video data to a receiving apparatus using High Definition Multimedia Interface (HDMI) communications.

(2) Description of the Related Art

In recent years, with advances in high-quality picture technologies and digitalization, HDMI communications which allow high speed digital transmission in an uncompressed mode is used for sending content including audio data and video data from a sending apparatus, such as a DVD recorder or a DVD player, to a receiving apparatus, such as a TV set or an amplifier. Moreover, for the purpose of protecting copyright of the content sent from the sending apparatus, apparatus authentication and content protection defined by the High-bandwidth Digital Content Protection (HDCP) standard (non-patent reference: "HDCP Specification Revision 1.2" of Digital Content Protection, LLC <URL: http://www.digital-cp.com/home>) are used these days.

The HDCP standard is designed to protect transmission of content between a sending apparatus that encrypts and sends content and a receiving apparatus that receives and decrypts the content. According to the HDCP standard, the sending apparatus uses an authentication protocol in order to perform apparatus authentication to verify the receiving apparatus. The apparatus authentication includes multiple authentications, including first, second, and third authentications. When it is judged that the receiving apparatus is an authorized apparatus as a result of the apparatus authentication, the receiving apparatus is allowed to decrypt the content which has been encrypted by the sending apparatus.

The apparatus authentication based on the HDCP standard is performed using Display Data Channel (DDC) communications.

The HDCP standard also defines a processing method, whereby apparatus verification is made as to whether or not the receiving apparatus is an authorized apparatus using an unauthorized apparatus list that includes information regarding unauthorized apparatuses. This list is referred to as the "Vector Revocation List" hereafter in the present specification. The apparatus verification is conducted by checking the validity of "System Renewability Message", and is executed during first and second authentications. When the receiving apparatus is judged to be an unauthorized apparatus, a process is followed so that the unauthorized receiving apparatus becomes unable to correctly decrypt the content which is currently being received or that the sending apparatus stops sending the content to the unauthorized apparatus, for example.

FIG. 1 is a diagram showing a configuration of a conventional audio-video communication system whereby the apparatus authentication is performed according to the HDCP standard. An audio-video communication system 500 shown in FIG. 1 is an HDMI communication system which includes a sending apparatus 510 such as a DVD player, and a receiving apparatus 520 such as a TV set. The sending apparatus 510 and the receiving apparatus 520 are connected via an HDMI cable 530.

The sending apparatus 510 is an audio-video output apparatus which outputs audio data and video data to the receiving apparatus 520 using the HDMI communications. The sending apparatus 510 includes a CPU (Central Processing Unit) 511, a disk controlling unit 512 for controlling a disk drive, a memory area 513, and an HDMI sending unit 514. The HDMI sending unit 514 is an LSI (Large-Scale Integration) which sends content including audio data and video data to the receiving apparatus 520. More specifically, the HDMI sending unit 514 sends the content including the audio and video data unidirectionally to the receiving apparatus 520 via the HDMI cable 530. The HDMI sending unit 514 has: an authenticating unit 515 for performing the apparatus authentication on the receiving unit 520; an encrypting unit 516 for encrypting the content which is to be sent; and a DDC unit 517. The CPU 511 controls the disk controlling unit 512, the memory area 513, and the HDMI sending unit 514. The DDC unit 517 establishes bidirectional DDC communications with the receiving apparatus 520 via the HDMI cable 530.

The memory area 513 holds the Vector Revocation List which includes information regarding unauthorized apparatuses. Under the assumption that the number of unauthorized apparatuses will be increasing on the market in the future, a latest Vector Revocation List is formed and distributed as appropriate. The sending apparatus 510 can acquire the latest Vector Revocation List through an external recording medium, such as a playback medium, or through a network, such as the Internet. It should be noted here that a method to update the Vector Revocation List is defined by the HDCP standard. After the acquisition of the latest Vector Revocation List through the playback medium or the like, the sending apparatus 510 stores the latest List in the memory area 513 and needs to immediately perform the apparatus verification on the receiving apparatus 520.

The receiving apparatus 520 includes a CPU 521 and an HDMI receiving unit 522. The HDMI receiving unit 522 is an LSI which receives the content including the audio and video data sent from the sending apparatus 510. The HDMI receiving unit 522 has: an authenticating unit 523 for performing the apparatus authentication; and a decrypting unit 524 for decrypting the received content. The CPU 521 controls the HDMI receiving unit 522.

FIG. 2 is a flowchart showing a process flow of the apparatus authentication performed by the conventional audio-video communication system 500. The sending apparatus 510 sets the content on mute, and then starts sending the content to the receiving unit 520 (S501). Here, since the content is set on mute, no picture is displayed and no audio is heard on the receiving apparatus 520. Next, the sending apparatus 510 executes the first authentication in relation to the receiving apparatus 520 (S502).

FIG. 3 is a flowchart showing a flow of the first authentication process (S502) performed by the conventional audio-video communication system 500. For the first authentication process (S502), the authenticating unit 515 first has the sending apparatus 510 and the receiving apparatus 520 exchange information needed for the authentication. In doing so, the sending apparatus 510 acquires Bksv information as the information about the receiving apparatus 520 (S601). The acquired information about the receiving apparatus 520 is held in the memory area 513. After the completion of the information exchange, the sending apparatus 510 and the receiving apparatus 520 generate information needed for the first authentication on the basis of the acquired information. Then, the first authentication process is performed using the generated information (S602). When the first authentication ends abnormally (NG in S602), the information about the receiving apparatus 520 held in the memory area 513 is abandoned (S606). Accordingly, the sending apparatus 510 abnormally ends the authentication process.

When the first authentication normally ends (Pass in S602), the authenticating unit 515 performs the apparatus verification by verifying a signature included in the Vector Revocation List held in the memory area 513 (S603). Next, the authenticating unit 515 judges whether or not the acquired information about the receiving apparatus 520 is present in the Vector Revocation List (S604). When the acquired information about the receiving apparatus 520 is present in the Vector Revocation List (Yes in S604), the authenticating unit 515 judges that the receiving apparatus 520 is an unauthorized apparatus (S605), abandons the information about the receiving apparatus 520 that is held in the memory area 513 (S606), and abnormally ends the authentication process. On the other hand, when the acquired information about the receiving apparatus 520 is not present in the Vector Revocation List (No in S604), the authenticating unit 515 judges that the receiving apparatus 520 is an authorized apparatus (S607). It should be noted here that the first authentication process may be executed after the verification process performed using the Vector Revocation List, that is, S602 may be executed after S607.

When the first authentication is unsuccessful (NG in S502), the sending apparatus 510 abnormally ends the content transmission. When the first authentication is successful (Pass in S502), the mute setting for the to-be-sent content is cancelled (S503). This means that the audio and video data of the content is heard and displayed on the receiving apparatus 520. After this, the authenticating unit 515 judges whether or not the second authentication is necessary (S504). To be more specific, when the receiving apparatus 520 connected to the sending apparatus 510 is further connected to another receiving apparatus, the authenticating unit 515 judges that the second authentication is necessary (Yes in S504). When only one receiving apparatus (i.e., the receiving apparatus 520 in this case) is connected to the sending apparatus 510, the authenticating unit 515 judges that the second authentication is unnecessary (No in S504).

When it is judged that the second authentication is necessary (Yes in S504), the authenticating unit 515 performs the second authentication (S505). It should be noted that a process flow of the second authentication is almost the same as that of the first authentication. A difference is that instead of acquiring the Bksv information in S601, the authenticating unit 515 acquires KSV List information as the information about the other receiving apparatus or apparatuses. Then, in S602, the authenticating unit 515 performs the second authentication instead of the first authentication. Note that the first and second authentications referred to here are the ones defined by the HDCP standard. When the second authentication is unsuccessful (NG in S505), the sending apparatus 510 abnormally ends the content transmission.

Meanwhile, when it is judged that the second authentication is unnecessary (No in S504) or when the second authentication is successful (Pass in S505), the authenticating unit 515 performs the third authentication (S506). Here, the third authentication includes a process to update an encryption key used by the encrypting unit 516 for encryption. When the third authentication is unsuccessful (NG in S506), the sending apparatus 510 abnormally ends the content transmission.

When the third authentication is successful (Pass in S506), the sending apparatus 510 acquires the Vector Revocation List held in the playback medium (S507). When the acquired Vector Revocation List is newer than the one held in the memory area 513 (Yes in S508), the sending apparatus 510 updates the Vector Revocation List held in the memory area 513 (S509). After the Vector Revocation List is updated (S509), the process from S501 to S508 is executed again.

On the other hand, when the acquired Vector Revocation List is older than the one held in the memory area 513 (No in S508), the Vector Revocation List held in the memory area 513 is not updated. Then, the third authentication (S506) is performed at predetermined intervals until the completion of the content transmission (Yes in S510).

According to the process described so far, the conventional sending apparatus 510 performs the apparatus authentication including the first and second authentications using the latest Vector Revocation List, which is updated as needed through the playback medium or the like.

After updating the Vector Revocation List (S509), however, the conventional sending apparatus 510 has to once again perform the first and second authentications (S502 and S505) using the updated Vector Revocation List. It should be noted here that the HDCP standard does not clearly define the apparatus verification performed after the start of the third authentication (S506), this third authentication being performed in a state where the receiving apparatus 520 is currently decrypting the encrypted content sent from the sending apparatus 510 and reproducing the audio and video data of the content. When the first and second authentications are executed once again in this state, the screen would have a temporary "blackout", meaning that the audio and video are set on mute. This would cause a user to have an extremely annoying situation. Moreover, a length of time of the blackout largely depends on the system configuration and the connection configuration of the HDMI apparatuses. In some cases, the blackout may last for several seconds.

In view of the stated problem, the object of the present invention is to provide an audio-video output apparatus, an authentication processing method, and an audio-video processing system which allow the apparatus authentication process to be performed without causing blackout.

SUMMARY OF THE INVENTION

In order to achieve the stated object, an audio-video output apparatus of the present invention is an audio-video output apparatus which outputs at least one of audio data and video data to a receiving apparatus using HDMI communications, the audio-video output apparatus including: a list holding unit which holds an authorized apparatus list that shows information about an unauthorized apparatus; an authenticating unit which performs a first apparatus authentication to verify whether or not the receiving apparatus is an authorized apparatus using the unauthorized apparatus list held by the list holding unit, and performs a second apparatus authentication at regular intervals to verify the receiving apparatus is an authorized apparatus; a list acquiring unit which acquires another unauthorized apparatus list; an updating unit which updates the unauthorized apparatus list held by the list holding unit to the unauthorized apparatus list acquired by the list acquiring unit when the unauthorized apparatus list acquired by the list acquiring unit is newer than the unauthorized apparatus list held by the list holding unit; and an apparatus verifying unit which verifies, when the unauthorized apparatus list is updated by the updating unit, whether or not the receiving apparatus is an authorized apparatus using the updated unauthorized apparatus list, the verification being performed in parallel with the second apparatus authentication performed by the authenticating unit.

With this configuration, when the unauthorized apparatus list is updated, the apparatus verifying unit performs the apparatus verification using the updated unauthorized apparatus list. This can prevent blackout which has been caused in the case of the conventional audio-video output apparatus whereby the first apparatus authentication (namely, the HDCP-defined first and second authentications) is once again performed using the updated unauthorized apparatus list. To be more specific, the audio-video output apparatus of the present invention can perform the apparatus authentication process without causing blackout. Moreover, the audio-video output apparatus of the present invention performs the apparatus verification using the updated unauthorized apparatus list in parallel with the second apparatus authentication (namely, the HDCP-defined third authentication). This can reduce a delay in executing the second apparatus authentication, the delay being caused due to the execution of the apparatus verification process. Accordingly, as compared with the case of the conventional sending apparatus, the audio-video output apparatus of the present invention can speedily perform the apparatus verification and the second apparatus authentication.

Moreover, the audio-video output apparatus further includes an apparatus information acquiring unit which acquires apparatus-unique information of the receiving apparatus when the first apparatus authentication is performed; and an apparatus information holding unit which holds the apparatus-unique information of the receiving apparatus acquired by the apparatus information acquiring unit, wherein: when the apparatus-unique information held by the apparatus information holding unit is not present in the unauthorized apparatus list held by the list holding unit, the authenticating unit judges that the receiving apparatus is an authorized apparatus in the first apparatus authentication; and when the apparatus-unique information acquired in the first apparatus authentication and held by the apparatus information holding unit is not present in the unauthorized apparatus list updated by the updating unit and held by the list holding unit, the apparatus verifying unit judges that the receiving apparatus is an authorized apparatus.

With this configuration, the apparatus verifying unit verifies whether or not the receiving apparatus is an authorized apparatus using the information about the receiving apparatus that is acquired in the first apparatus authentication as well as using the updated unauthorized apparatus list. Thus, when the apparatus verification is performed once again after the unauthorized apparatus list is updated, the information about the receiving apparatus does not need to be reacquired. This can reduce the amount of process which has been needed in the case where the unauthorized apparatus list is updated and the apparatus verification is performed again using the updated unauthorized apparatus list.

Furthermore, the apparatus verifying unit may include a signature verifying unit which verifies, when the unauthorized apparatus list is updated by the updating unit, whether or not signature information included in the updated unauthorized apparatus list is valid, the verification being performed in parallel with the second apparatus authentication performed by the authenticating unit.

With this configuration, the signature included in the unauthorized apparatus list is verified in parallel with the second apparatus authentication (namely, the HDCP-defined third authentication). Here, the signature verification needs a great amount of process and takes a long processing time. Thus, this parallel processing can reduce a delay in executing the second apparatus authentication, the delay being caused due to the execution of the apparatus verification process including the signature verification. More specifically, the audio-video output apparatus of the present invention can speedily perform the apparatus verification and the second apparatus authentication.

Also, the list acquiring unit may acquire the unauthorized apparatus list in parallel with the second apparatus authentication performed by the authenticating unit, and the updating unit may update the unauthorized apparatus list held by the list holding unit to the unauthorized apparatus list acquired by the list acquiring unit when the unauthorized apparatus list acquired by the list acquiring unit is newer than the unauthorized apparatus list held by the list holding unit, the updating being performed in parallel with the second apparatus authentication performed by the authenticating unit.

With this configuration, the acquisition of the unauthorized apparatus list through a playback medium or the like and the updating of the acquired unauthorized apparatus list are performed in parallel with the second apparatus authentication (namely, the HDCP-defined third authentication). Accordingly, as compared with the case of the conventional sending apparatus, the apparatus verification and the second apparatus authentication can be speedily performed.

Moreover, the first and second apparatus authentications performed on the receiving apparatus by the authenticating unit may be defined by the HDCP standard, the first apparatus authentication may include first and second authentications defined by the HDCP standard, and the second apparatus authentication may include a third authentication defined by the HDCP standard.

With this configuration, according to the apparatus authentication defined by the HDCP standard, when the unauthorized apparatus list is updated, the apparatus verifying unit performs the apparatus verification using the updated unauthorized apparatus list. This can prevent blackout, which has been caused in the case of the conventional audio-video output apparatus whereby the first apparatus authentication (namely, the HDCP-defined first and second authentications) is once again performed using the updated unauthorized apparatus list. To be more specific, the audio-video output apparatus of the present invention can perform the apparatus authentication process without causing blackout. Moreover, the audio-video output apparatus of the present invention performs the apparatus verification using the updated unauthorized apparatus list in parallel with the second apparatus authentication (namely, the HDCP-defined third authentication). This can reduce a delay in executing the second apparatus authentication, the delay being caused due to the execution of the apparatus verification process. Accordingly, as compared with the case of the conventional sending apparatus, the audio-video output apparatus of the present invention can speedily perform the apparatus verification and the second apparatus authentication.

Furthermore, an audio-video processing system of the present invention is an audio-video processing system which outputs at least one of audio data and video data to a receiving apparatus using the HDMI communications, the audio-video output system including: an audio-video output device which is described in one of Claims 1 to 5; a processing unit which reads at least one of the audio data and the video data from a recording medium and to process the read data; and an output unit which outputs the data processed by the processing unit to the receiving apparatus using the HDMI communications.

With this configuration, when the unauthorized apparatus list is updated, the apparatus verifying unit performs the apparatus verification using the updated unauthorized apparatus list. This can prevent blackout, which has been caused in the case of the conventional audio-video processing system whereby the first apparatus authentication (namely, the HDCP-defined first and second authentications) is once again performed using the updated unauthorized apparatus list. To be more specific, the audio-video processing system of the present invention can perform the apparatus authentication process without causing blackout. Moreover, the audio-video processing system of the present invention performs the apparatus verification using the updated unauthorized apparatus list in parallel with the second apparatus authentication (namely, the HDCP-defined third authentication). This can reduce a delay in executing the second apparatus authentication, the delay being caused due to the execution of the apparatus verification process. Accordingly, as compared with the case of the conventional sending apparatus, the audio-video processing system of the present invention can speedily perform the apparatus verification and the second apparatus authentication.

Also, an authentication processing method of the present invention is an authentication processing method for an audio-video output apparatus which outputs at least one of audio data and video data to a receiving apparatus using the HDMI communications and includes a list holding unit which holds an unauthorized apparatus list that shows information about an unauthorized apparatus, the authentication processing method including: performing a first apparatus authentication to verify whether or not the receiving apparatus is an authorized apparatus using the unauthorized apparatus list held by the list holding unit; acquiring another unauthorized apparatus list; updating the unauthorized apparatus list held by the list holding unit to the unauthorized apparatus list acquired in the acquiring when the unauthorized apparatus list acquired in the acquiring is newer than the unauthorized apparatus list held by the list holding unit; and verifying, when the unauthorized apparatus list is updated in the updating, whether or not the receiving apparatus is an authorized apparatus using the updated unauthorized apparatus list, the verifying being performed in parallel with a second apparatus authentication performed at regular intervals to verify whether or not the receiving apparatus is an authorized apparatus.

With this method, when the unauthorized apparatus list is updated, the apparatus verification is performed using the updated unauthorized apparatus list in the apparatus verifying. This can prevent blackout, which has been caused in the case of the conventional authentication processing method whereby the first apparatus authentication (namely, the HDCP-defined first and second authentications) is once again performed using the updated unauthorized apparatus list. To be more specific, according to the authentication processing method of the present invention, the apparatus authentication process can be performed without causing blackout. Moreover, according to the authentication processing method of the present invention, the apparatus verification is performed using the updated unauthorized apparatus list in parallel with the second apparatus authentication (namely, the HDCP-defined third authentication). This can reduce a delay in executing the second apparatus authentication, the delay being caused due to the execution of the apparatus verification process. Accordingly, as compared with the case of the conventional authentication processing method, the authentication processing method of the present invention allows the apparatus verification and the second apparatus authentication to be speedily performed.

As explained so far, the present invention can provide an audio-video output apparatus, an authentication processing method, and an audio-video processing system which allow the apparatus authentication process to be performed without causing blackout.

FURTHER INFORMATION ABOUT TECHNICAL BACKGROUND TO THIS APPLICATION

The disclosure of Japanese Patent Application No. 2006-316938 filed on Nov. 24, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

The following is a detailed description of an embodiment of an audio-video communication system which includes an audio-video output apparatus related to the present invention, with reference to the drawings.

When the Vector Revocation List is updated, the audio-video output apparatus of the present invention once again performs the apparatus verification using the updated Vector Revocation List in parallel with the third authentication. Thus, the system of the present invention can prevent occurrence of blackout, which has been caused in the case of the conventional audio-video communication system.

First, an explanation is given as to a configuration of the audio-video communication system according to the embodiment of the present invention.

Figure 1:
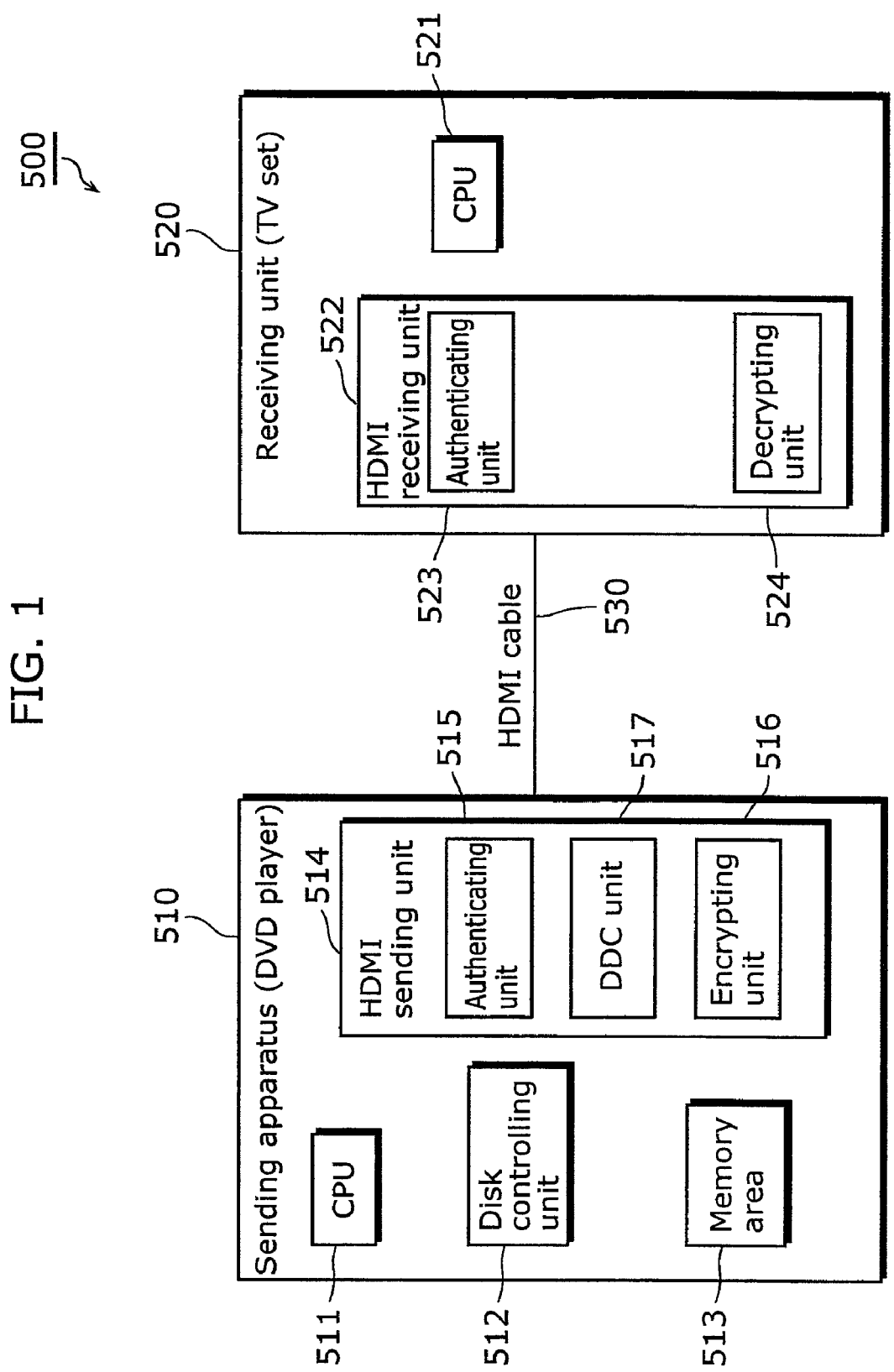
FIG. 1 is a block diagram showing a configuration of a conventional audio-video communication system.
Figure 2:
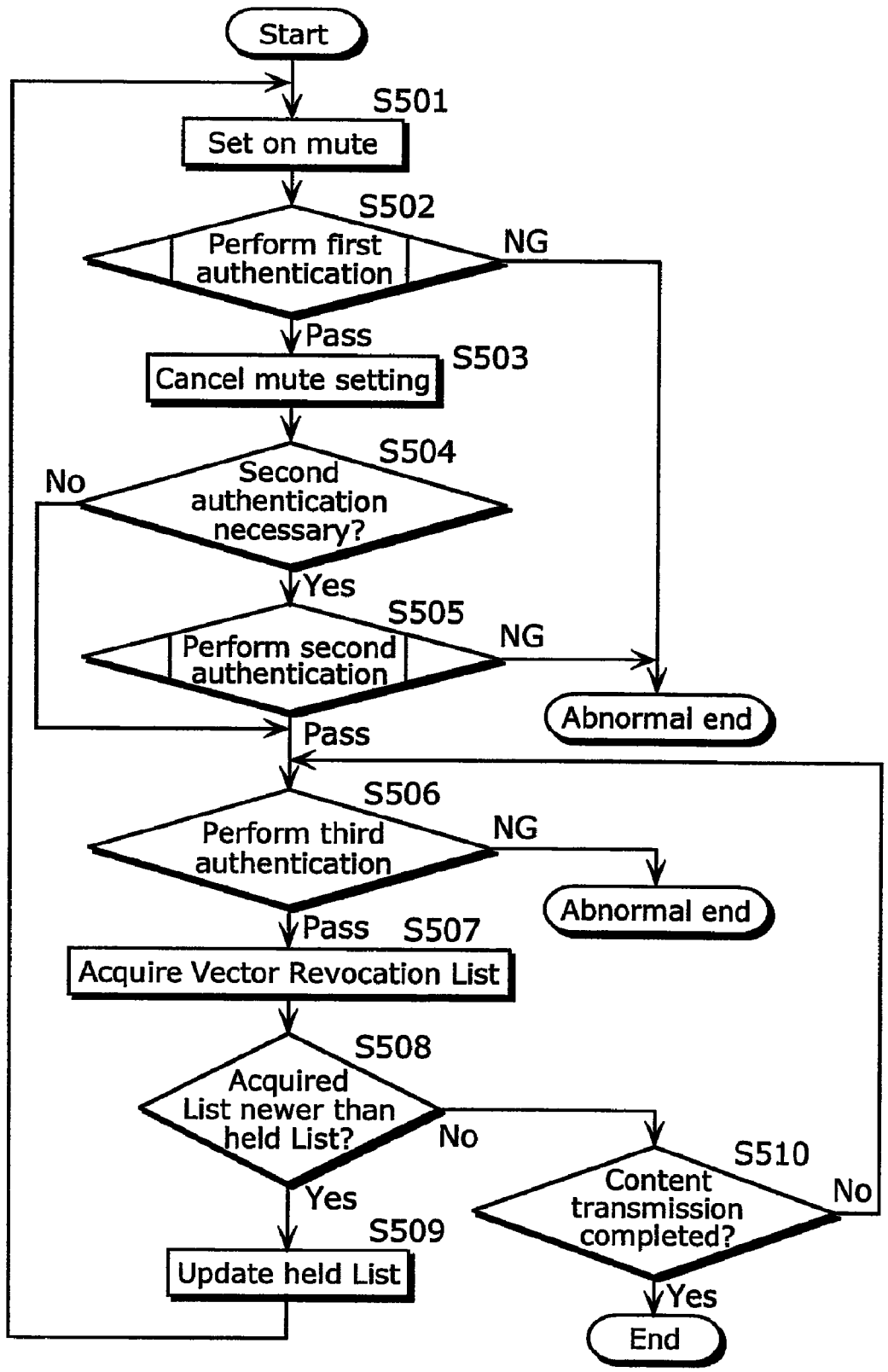
FIG. 2 is a flowchart showing a process flow of apparatus authentication performed by the conventional audio-video communication system.
Figure 3:
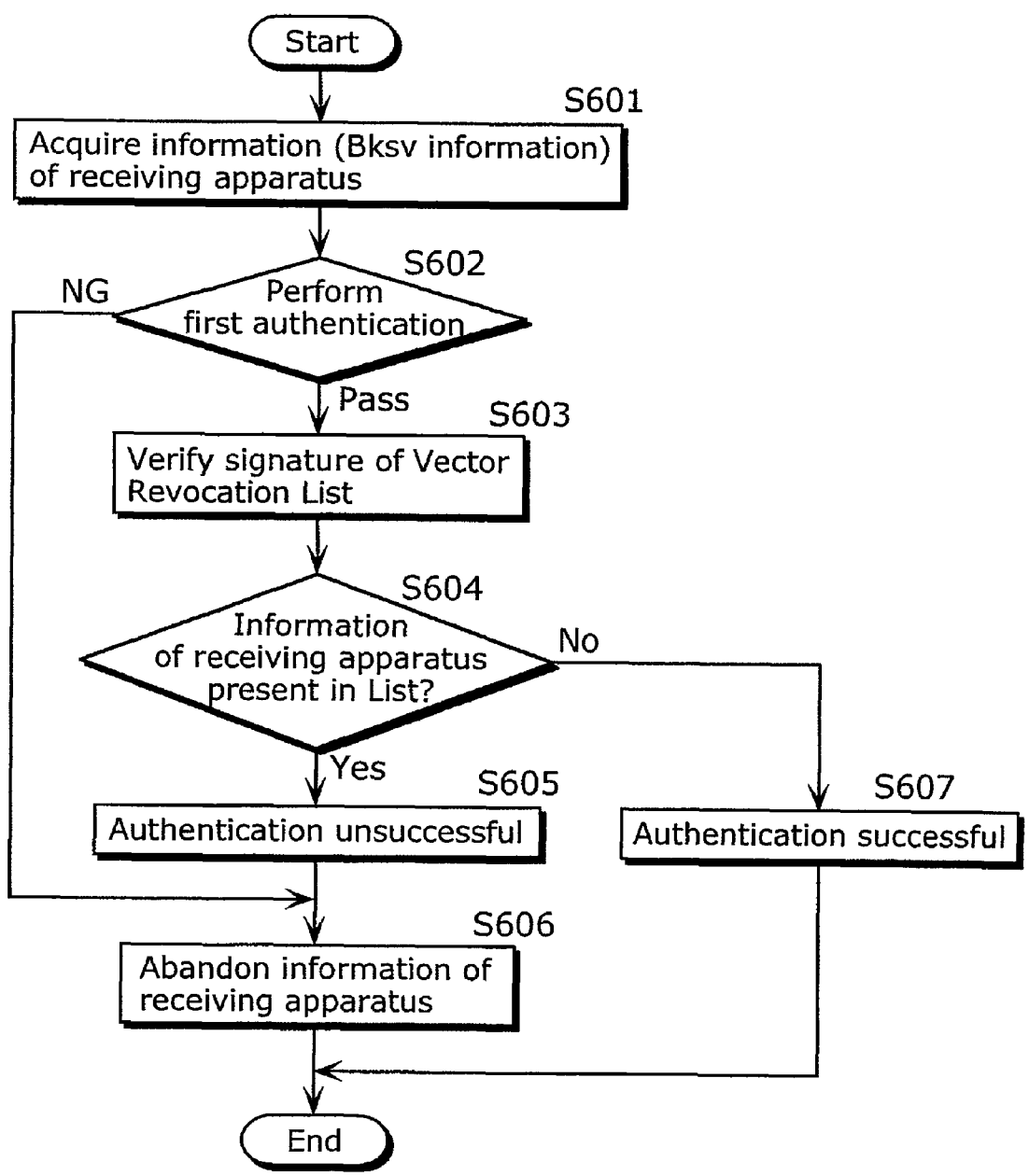
FIG. 3 is a flowchart showing a process flow of first authentication performed by the conventional audio-video communication system.
Figure 4:
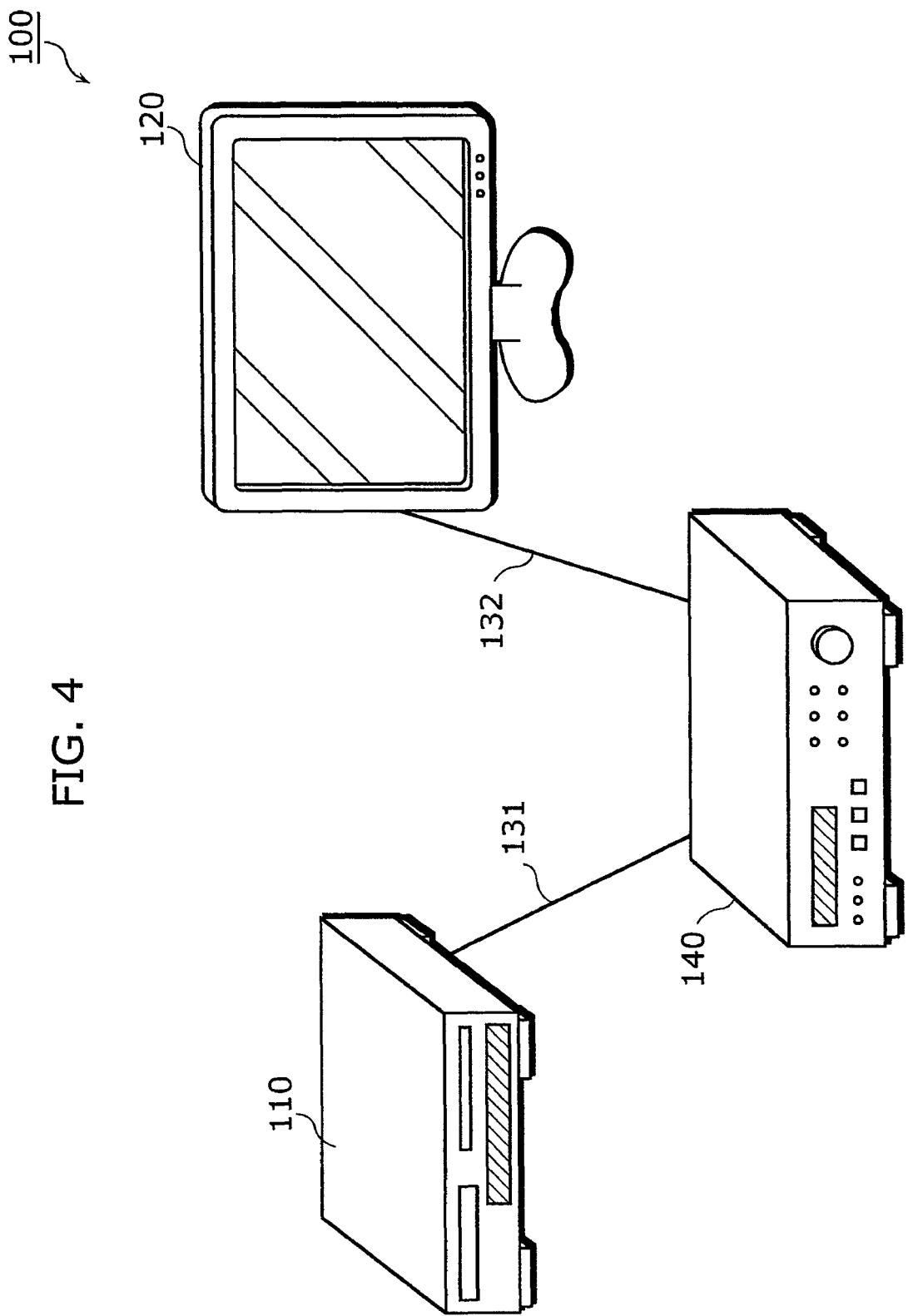
FIG. 4 is a schematic diagram showing a configuration of an audio-video communication system according to an embodiment of the present invention.

FIG. 4 is a schematic diagram showing a configuration of the audio-video communication system according to the embodiment of the present invention.

An audio-video communication system 100 shown in FIG. 4 includes: a sending apparatus 110, such as a DVD player; a receiving apparatus 120, such as a TV set; and a receiving apparatus 140, such as an amplifier. The sending apparatus 110 is an audio-video output apparatus, such as a DVD player, which plays back and outputs audio data and video data stored in a playback medium or the like. The receiving apparatus 120 is a display apparatus, such as a TV set, which reproduces the audio data and the video data outputted from the sending apparatus 110. The receiving apparatus 140 is an amplifier or the like which processes and outputs the audio data and the video data sent from the sending apparatus 110. The sending apparatus 110 and the receiving apparatus 140 are connected via an HDMI cable 131. The receiving apparatus 140 and the receiving apparatus 120 are connected via an HDMI cable 132. For example, the sending apparatus 110 plays back a DVD medium or the like, and sends the played-back audio and video data to the receiving apparatus 120 via the receiving apparatus 140. Then, the receiving apparatus 120 reproduces the received audio and video data. It should be noted here that although the sending apparatus 110 is connected to the receiving apparatus 120 via the receiving apparatus 140 in FIG. 4, the sending apparatus 110 and the receiving apparatus 120 may be directly connected to each other via an HDMI cable. Also, note that one or more receiving apparatuses may be connected to the receiving apparatus 140 that is connected to the sending apparatus 110.

The following is a detailed explanation as to the configuration of the audio-video communication system 100 in a case where the sending apparatus 110 such as a DVD player is connected to the receiving apparatus 120 such as a TV set on a one-on-one basis.

Figure 5:
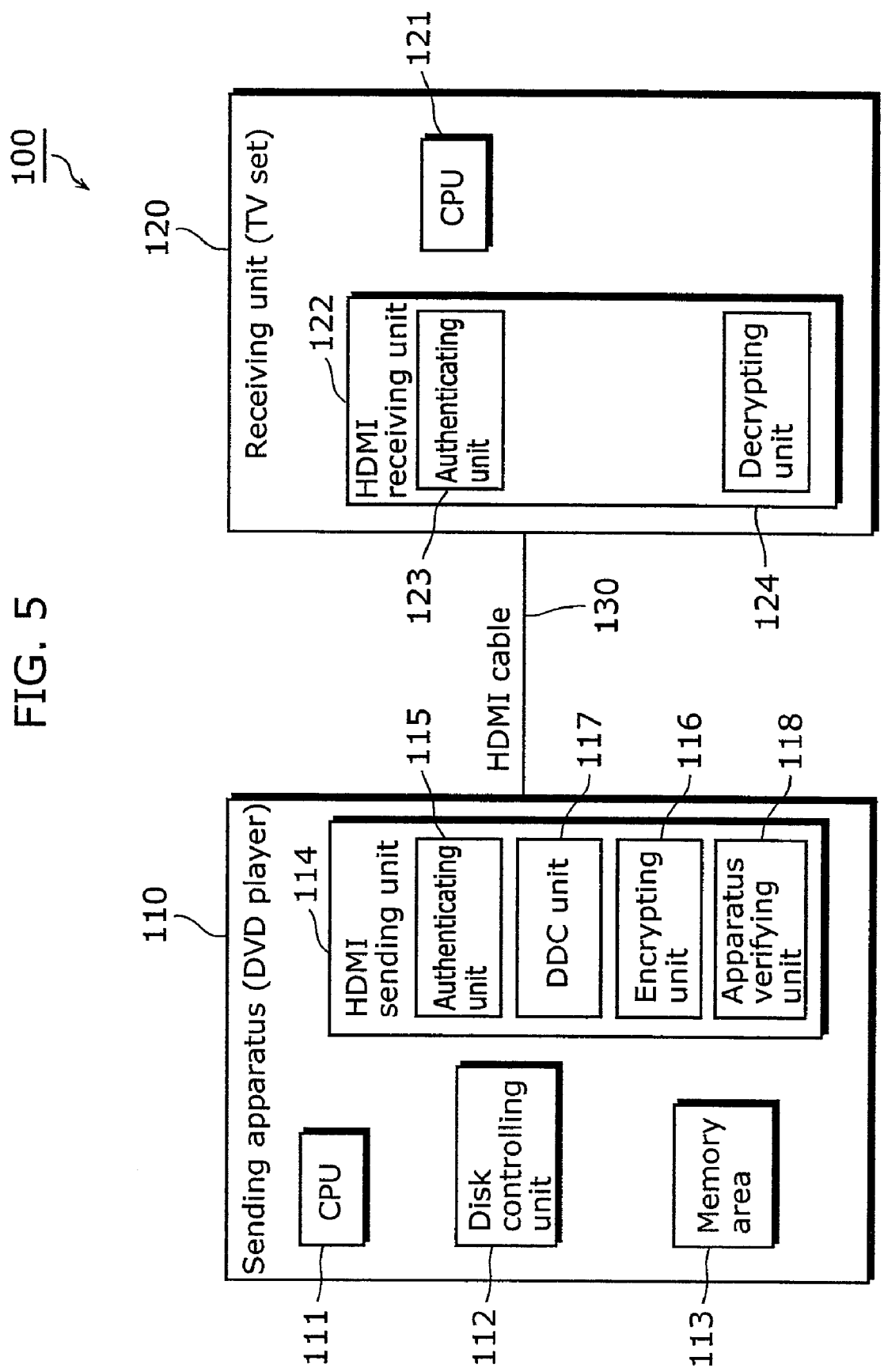
FIG. 5 is a diagram showing a configuration of the audio-video communication system according to the embodiment of the present invention.

FIG. 5 is a diagram showing a configuration of the audio-video communication system 100 according to the embodiment of the present invention.

The audio-video communication system 100 shown in FIG. 5 includes: the sending apparatus 110, such as a DVD player; and the receiving apparatus 120, such as a TV set. The sending apparatus 110 and the receiving apparatus 120 are connected via a HDMI cable 130.

The sending apparatus 110 is an audio-video output apparatus which outputs audio data and video data to the receiving apparatus 120 using the HDMI communications. More specifically, the sending apparatus 110 is an audio-video processing system which processes audio data and video data stored in a recording medium such as a DVD medium, and then outputs the processed audio and video data to the receiving apparatus 120 using the HDMI communications. The sending apparatus 110 includes: a CPU 111; a disk controlling unit 112; a memory area 113; and an HDMI sending unit 114.

The CPU 111 controls the disk controlling unit 112, the memory area 113, and the HDMI sending unit 114.

The disk controlling unit 112 controls a disk drive into which a recording medium such as a DVD medium is to be inserted.

Moreover, the disk controlling unit 112 processes the audio and video data stored in the recording medium.

The memory area 113 holds the Vector Revocation List which includes information regarding unauthorized apparatuses. Under the assumption that the number of unauthorized apparatuses will be increasing on the market in the future, a latest Vector Revocation List is formed and distributed as appropriate. The sending apparatus 110 can acquire the latest Vector Revocation List through an external recording medium, such as a playback medium, or through a network, such as the Internet. It should be noted here that a method to update the Vector Revocation List is defined by the HDCP standard. After the acquisition of the latest Vector Revocation List through the playback medium or the like, the sending apparatus 110 stores the latest List in the memory area 113 and needs to immediately perform the apparatus verification on the receiving apparatus 120. In addition, the memory area 113 holds information which is unique to the receiving apparatus 120. Here, information unique to an apparatus may be referred to as the "apparatus-unique information" hereafter in this specification.

The HDMI sending unit 114 is an LSI which encrypts the content including the audio and video data processed by the disk controlling unit 112 and sends the encrypted data to the receiving apparatus 120 via the HDMI communications. The HDMI sending unit 114 sends the content including the audio and video data unidirectionally to the receiving apparatus 120 via the HDMI cable 130. The HDMI sending unit 114 has an authenticating unit 115, an encrypting unit 116, a DDC unit 117, and an apparatus verifying unit 118.

The authenticating unit 115 performs apparatus authentication to judge whether or not the receiving apparatus 120 is an authorized apparatus. This apparatus authentication performed on the receiving apparatus 120 by the authenticating unit 115 is the one defined by the HDCP standard and includes first, second, and third authentications. For each process of the first and second authentications, the sending apparatus 110 and the receiving apparatus 120 exchange information needed for the authentication, so that each of the sending apparatus 110 and the receiving apparatus 120 verifies whether or not the other end of connection is an authorized apparatus. In the first and second authentications, the sending apparatus 110 performs apparatus verification using the Vector Revocation List held in the memory area 113 as well as using apparatus-unique information of the receiving apparatus 120, i.e., Bksv information or KSV List information, in order to verify the receiving apparatus 120 is an authorized apparatus. The third authentication refers to apparatus authentication performed at regular intervals between the sending apparatus 110 and the receiving apparatus 120. To be more specific, the third authentication includes updating and verifying information used for encrypting and decrypting the content.

The encrypting unit 116 encrypts the content to be sent to the receiving apparatus 120.

The DDC unit 117 establishes bidirectional DDC communications with the receiving apparatus 120 via the HDMI cable 130. In the first and second authentications, the DDC unit 117 acquires the apparatus-unique information of the receiving apparatus 120. The memory area 113 holds the apparatus-unique information acquired by the DDC unit 117.

The apparatus verifying unit 118 performs apparatus verification to judge whether or not the receiving apparatus 120 is an authorized apparatus. In parallel with the third authentication performed by the authenticating unit 115, the apparatus verifying unit 118 acquires the Vector Revocation List held in the recording medium, such as a DVD medium. Moreover, in parallel with the third authentication performed by the authenticating unit 115, the apparatus verifying unit 118 judges whether or not the acquired Vector Revocation List is newer than the Vector Revocation List held in the memory area 113. When the acquired Vector Revocation List is newer than the Vector Revocation List held in the memory area 113, the apparatus verifying unit 118 updates the Vector Revocation List held in the memory area 113 to the acquired Vector Revocation List. After the Vector Revocation List is updated, the apparatus verifying unit 118 verifies whether or not the receiving apparatus 120 is an authorized apparatus using the updated Vector Revocation List in parallel with the third authentication performed by the authenticating unit 115.

The receiving apparatus 120 includes a CPU 121, and an HDMI receiving unit 122. The HDMI receiving unit 122 is an LSI which receives the content including the audio and video data sent from the sending apparatus 110. The HDMI receiving unit 122 has an authenticating unit 123 for performing apparatus authentication, and a decrypting unit 124 for decrypting the received content. The CPU 121 controls the HDMI receiving unit 122.

Next, an explanation is given as to an operation performed by the audio-video communication system 100 according to the embodiment of the present invention.

Figure 6:
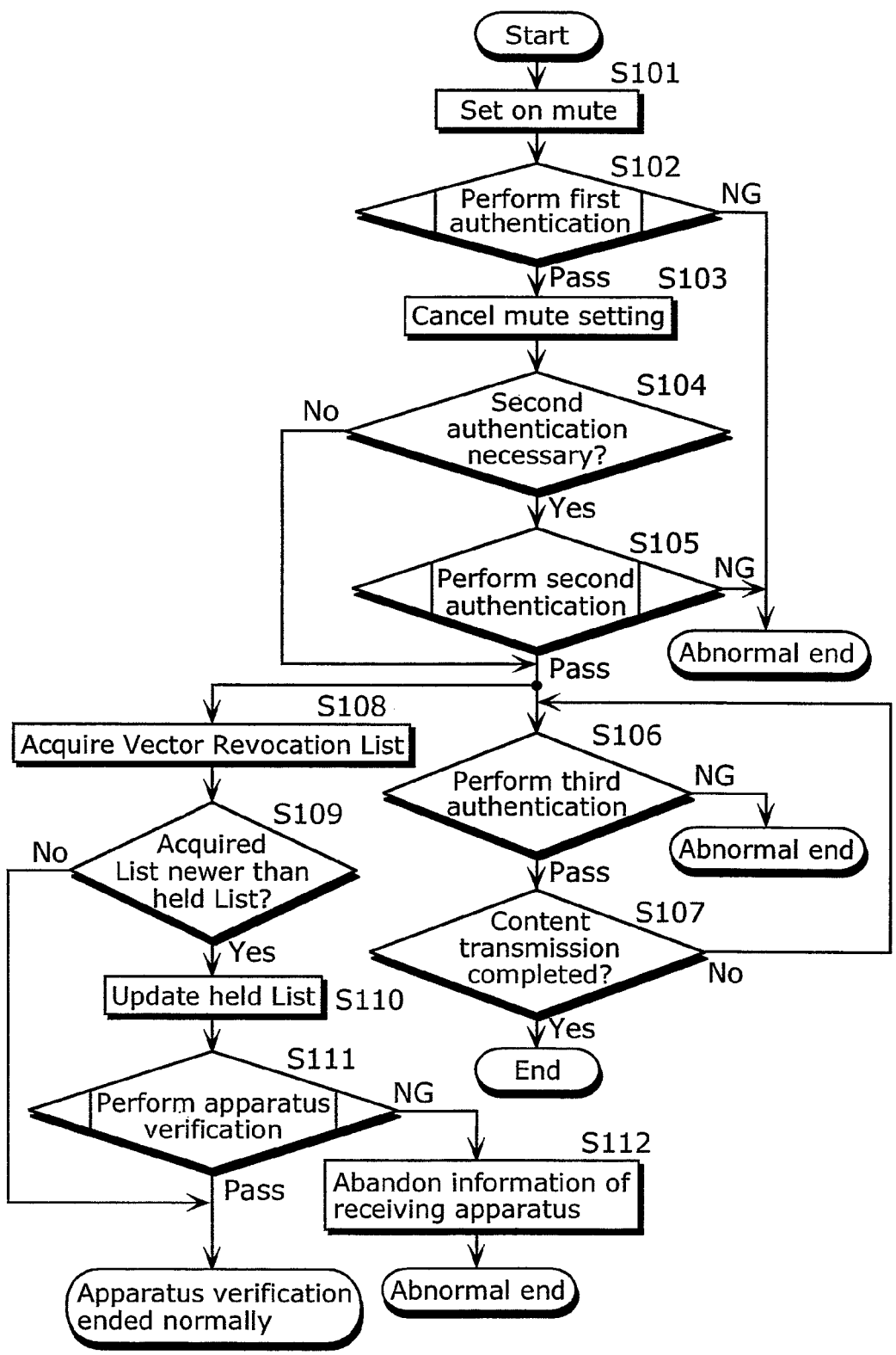
FIG. 6 is a flowchart showing a process flow of apparatus authentication performed by the audio-video communication system according to the embodiment of the present invention.

FIG. 6 is a flowchart showing a process flow of the apparatus authentication performed by the audio-video communication system 100 according to the embodiment of the present invention. The process shown in FIG. 6 is performed, for example: at system startup of the audio-video communication system 100; when a DVD medium is changed; or when content downloading is started via the Internet. The process shown in FIG. 6 is also performed: at power-on of the sending apparatus 110; and when the configuration of the audio-video communication system 100 is changed because of a change in the connection configuration of the receiving apparatus or apparatuses connected to the sending apparatus 110.

First, the sending apparatus 110 sets the content on mute, and then starts sending the content to the receiving unit 120 (S101). As mentioned earlier in the Related Art, since the content is set on mute, no picture is displayed and no audio is heard on the receiving apparatus 120. Next, the sending apparatus 110 executes the first authentication with the receiving apparatus 120 (S102).

Figure 7:
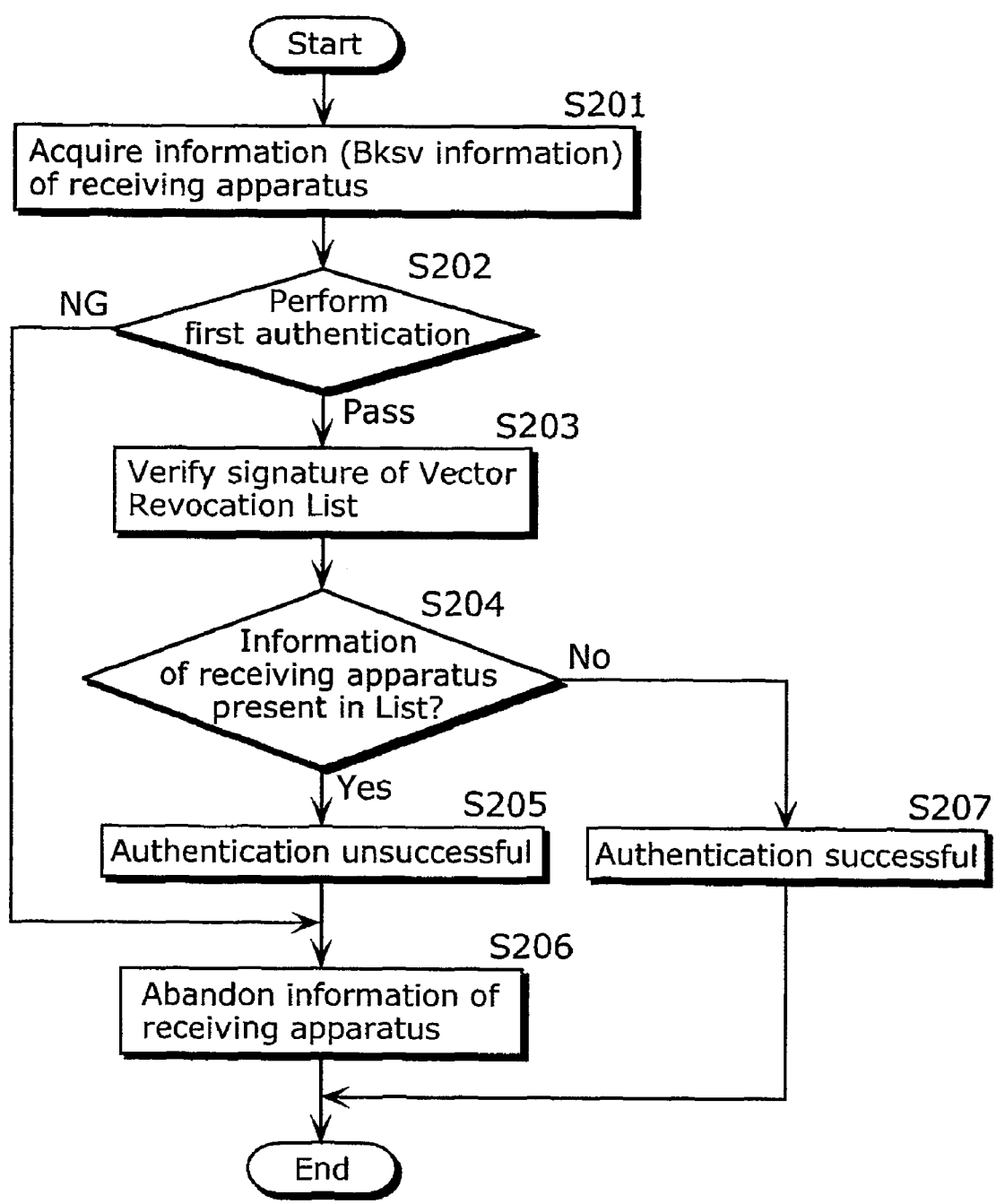
FIG. 7 is a flowchart showing a process flow of first authentication performed by the audio-video communication system according to the embodiment of the present invention.

FIG. 7 is a flowchart showing the first authentication process (S102) performed by the audio-video communication system 100. In the first authentication (S102), the authenticating unit 115 has the sending apparatus 110 and the receiving apparatus 120 exchange information needed for the authentication. In doing so, the authenticating unit 115 acquires information about the receiving apparatus 120 (S201). To be more specific, from the receiving apparatus 120 via the DDC communications, the DDC unit 117 acquires Bksv information as the apparatus-unique information of the receiving apparatus 120. The Bksv information acquired by the DDC unit 117 is held in the memory area 113.

Figure 8:
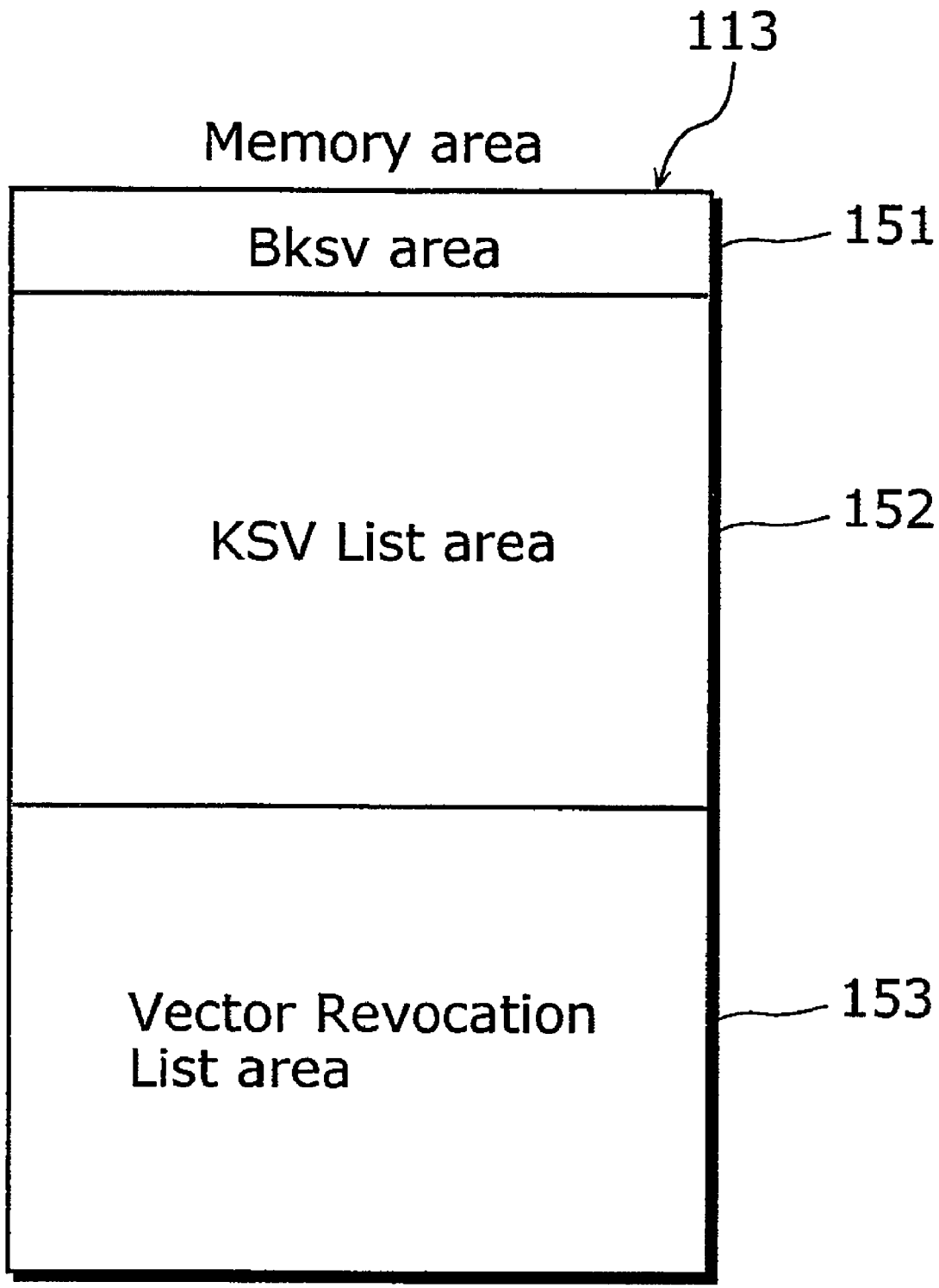
FIG. 8 is a diagram showing a configuration of a memory area included in the audio-video communication system according to the embodiment of the present invention.

FIG. 8 is a schematic diagram showing a configuration of the memory area 113. The memory area 113 is made up of a Bksv area 151, a KSV List area 152, and a Vector Revocation List area 153. The Bksv information acquired in S201 is held in the Bksv area 151 of the memory area 113. Here, note that data formats of the Vector Revocation List, the Bksv information, and the KSV List information which are held in the memory area 113 are the ones defined by the HDCP standard. After the completion of the information exchange between the sending apparatus 110 and the receiving apparatus 120, the authenticating unit 115 and the authenticating unit 123 generate information needed for the first authentication on the basis of the acquired information. Then, the authenticating unit 115 and the authenticating unit 123 perform the first authentication process using the generated information (S202). When the first authentication process ends abnormally (NG in S202), the apparatus-unique information of the receiving apparatus 120 held in the memory area 113 is abandoned (S206). Accordingly, the sending apparatus 110 abnormally ends the authentication process. When the first authentication process normally ends (Pass in S202), the authenticating unit 115 verifies a signature included in the Vector Revocation List held in the memory area 113 (S203). To be more specific, the authenticating unit 115 verifies whether or not the signature included in the Vector Revocation List held in the Vector Revocation List area 153 is valid. Although not shown in FIG. 7, when the signature of the Vector Revocation List is invalid, the authentication process is abnormally ended or a process, such as reacquisition of the Vector Revocation List, is performed.

Next, the authenticating unit 115 judges whether or not the Bksv information of the receiving apparatus 120 is present in the Vector Revocation List held in the Vector Revocation List area 153 (S204). When the Bksv information of the receiving apparatus 120 is present in the Vector Revocation List (Yes in S204), the authenticating unit 115 judges that the receiving apparatus 120 is an unauthorized apparatus (S205). When it is judged that the receiving apparatus 120 is an unauthorized apparatus, the apparatus-unique information of the receiving apparatus 120, i.e., the Bksv information, held in the memory area 113 is abandoned (S206). When the Bksv information of the receiving apparatus 120 is not present in the Vector Revocation List (No in S204), the authenticating unit 115 judges that the receiving apparatus 120 is an authorized apparatus (S207).

When the first authentication is unsuccessful (NG in S102), the sending apparatus 110 abnormally ends the content transmission. When the first authentication is successful (Pass in S102), the mute setting is cancelled for the content to be sent (S103). This means that the audio and video data included in the content is heard and displayed on the receiving apparatus 120. After this, the authenticating unit 115 judges whether or not the second authentication is necessary (S104). To be more specific, when one or more receiving apparatuses are connected to the receiving apparatus 120, the authenticating unit 115 judges that the second authentication is necessary (Yes in S104). For example, suppose that the receiving apparatus 120 is a "repeater" in such a case where the receiving apparatus 120, such as a TV set, is connected to the sending apparatus 110 via the receiving apparatus 140, such as an amplifier, as shown in FIG. 4. In this case, the authenticating unit 115 judges that the second authentication is necessary. On the other hand, when only one receiving apparatus is connected to the sending apparatus 110, the authenticating unit 115 judges that the second authentication is unnecessary (No in S104).

When it is judged that the second authentication is necessary (Yes in S104), the authenticating unit 115 performs the second authentication (S105). Here, a process flow of the second authentication is almost the same as that of the first authentication shown in FIG. 7.

Figure 9:
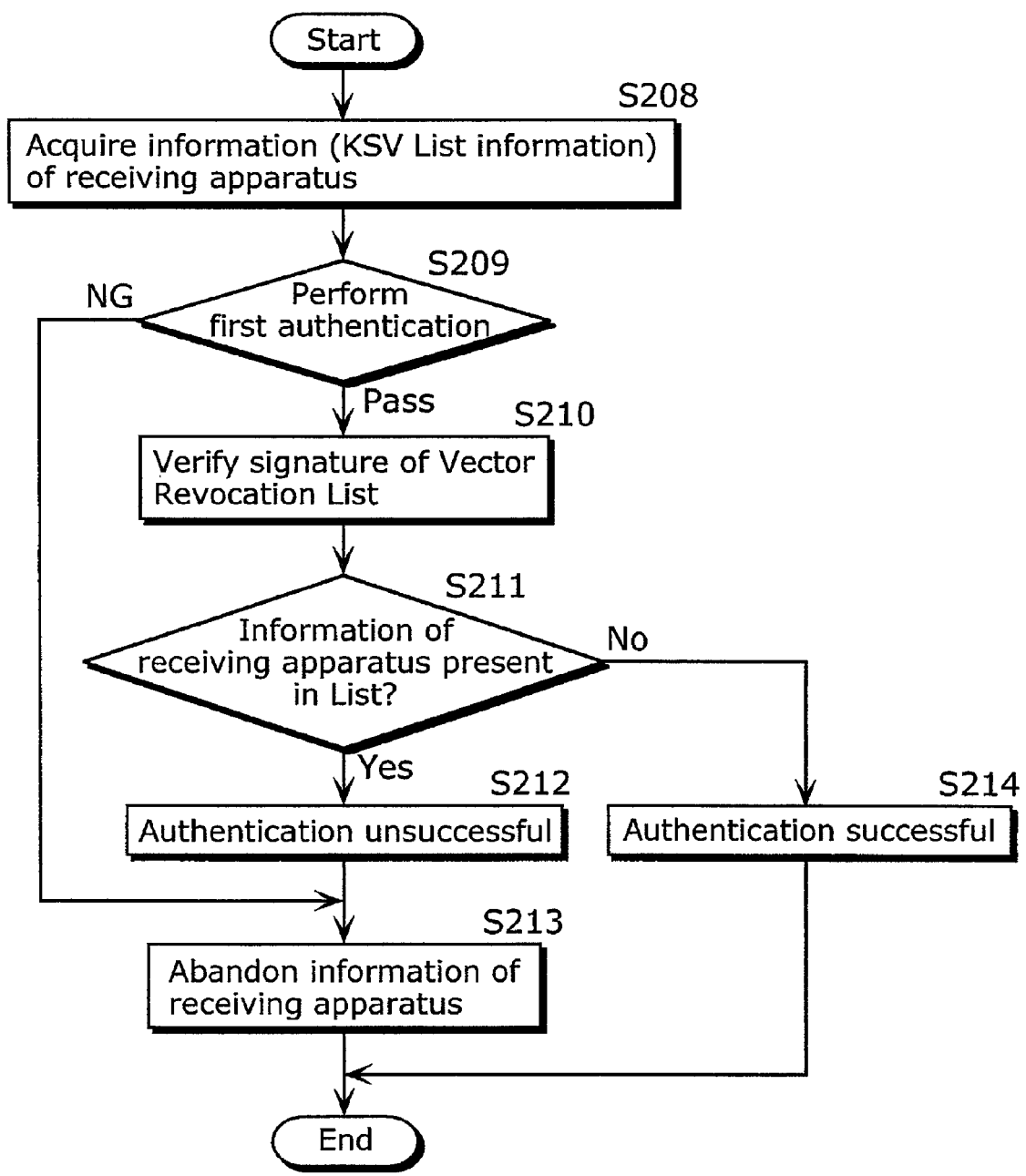
FIG. 9 is a flowchart showing a process flow of second authentication performed by the audio-video communication system according to the embodiment of the present invention.

FIG. 9 is a flowchart showing a process flow of the second authentication (S105) performed by the audio-video communication system 100. For the apparatus verification performed in the case of the second authentication (S105), the DDC unit 117 first acquires respective pieces of apparatus-unique information of the receiving apparatuses 120 (S208). To be more specific, from the plurality of the receiving apparatuses 120 connected to the sending apparatus 110, the DDC unit 117 acquires respective pieces of KSV List information via the DDC communications. Here, each piece of the KSV List information includes information about a corresponding one of the plurality of the receiving apparatuses 120 connected to the sending apparatus 110. For example, when the receiving apparatus 120 is connected to the sending apparatus 110 via the receiving apparatus 140 as shown in FIG. 4, the KSV List information includes a piece of apparatus-unique information of the receiving apparatus 140 connected to the receiving apparatus 120. The KSV List information acquired by the DDC unit 117 is held in the KSV List area 152 of the memory area 113.

Next, the authenticating unit 115 performs the apparatus authentication on the receiving apparatuses 120 through the second authentication process (S209). Here, note that this second authentication process is the one defined by the HDCP standard. When the second authentication process abnormally ends (NG in S209), the apparatus-unique information of the receiving apparatuses 120 held in the memory area 113 is abandoned (S213) and the sending apparatus 110 abnormally ends the authentication process.

When the second authentication process normally ends (Pass in S209), the authenticating unit 115 verifies a signature included in the Vector Revocation List held in the memory area 113 (S210). To be more specific, the authenticating unit 115 verifies whether or not the signature included in the Vector Revocation List held in the Vector Revocation List area 153 is valid.

Next, the authenticating unit 115 judges whether or not the pieces of apparatus-unique information of the receiving apparatuses 120, which are included in the KSV List information, are present in the Vector Revocation List held in the Vector Revocation List area 153 (S211). When at least one of the acquired pieces of apparatus-unique information is present in the Vector Revocation List (Yes in S211), the authenticating unit 115 judges that the receiving apparatuses 120 are unauthorized apparatuses (S212). In this case, all the pieces of information about the receiving apparatuses 120 which are held in the memory area 113 are abandoned (S213). On the other hand, when no piece of the acquired apparatus-unique information is present in the Vector Revocation List (No in S211), the authenticating unit 115 judges that the receiving apparatuses 120 are authorized apparatuses (S214).

Referring back to FIG. 6, when the second authentication is unsuccessful (NG in S105), the sending apparatus 110 abnormally ends the content transmission.

When it is judged that the second authentication is unnecessary (No in S104) or when the second authentication is successful (Pass in S105), the authenticating unit 115 performs the third authentication. Here, the third authentication includes a process to update an encryption key used by the encrypting unit 116 for encryption. To be more specific, during the third authentication process, the authenticating unit 115 updates encryption information Ri1 and decryption information Ri2. The encryption information Ri1 is used by the encryption unit 116 for encryption, whereas the decryption information Ri2 is used by the decryption unit 124 for decryption. In addition to the updating, the authenticating unit 115 verifies the encryption information Ri1 held by the sending apparatus 110 and the decryption information Ri2 held by the receiving apparatus 120. When the third authentication is unsuccessful (NG in S106), the sending apparatus 110 abnormally ends the content transmission.

When the third authentication is successful (Pass in S106), the third authentication (S106) is performed at predetermined intervals, such as once every several seconds, until the completion of the content transmission (Yes in S107).

On the other hand, after the end of the second authentication (S105) or when it is judged that the second authentication is unnecessary (No in S104), a process from S108 to S112 described below is performed in parallel with the third authentication process (S106).

When it is judged that the second authentication is unnecessary (No in S104) or when the second authentication is successful (Pass in S105), the apparatus verifying unit 118 acquires the Vector Revocation List held in the playback medium (S108). Then, the apparatus verifying unit 118 judges whether or not the acquired Vector Revocation List is newer than the one held in the memory area 113. To be more specific, by comparing version information of the respective Vector Revocation Lists, the apparatus verifying unit 118 judges whether or not the acquired Vector Revocation List is newer than the one held in the memory area 113. When the acquired Vector Revocation List is newer than the one held in the memory area 113 (Yes in S109), the apparatus verifying unit 118 updates the Vector Revocation List held in the memory area 113 (S110).

Next, the apparatus verifying unit 118 performs the apparatus verification using the Vector Revocation List updated in S110 (S111).

Figure 10:
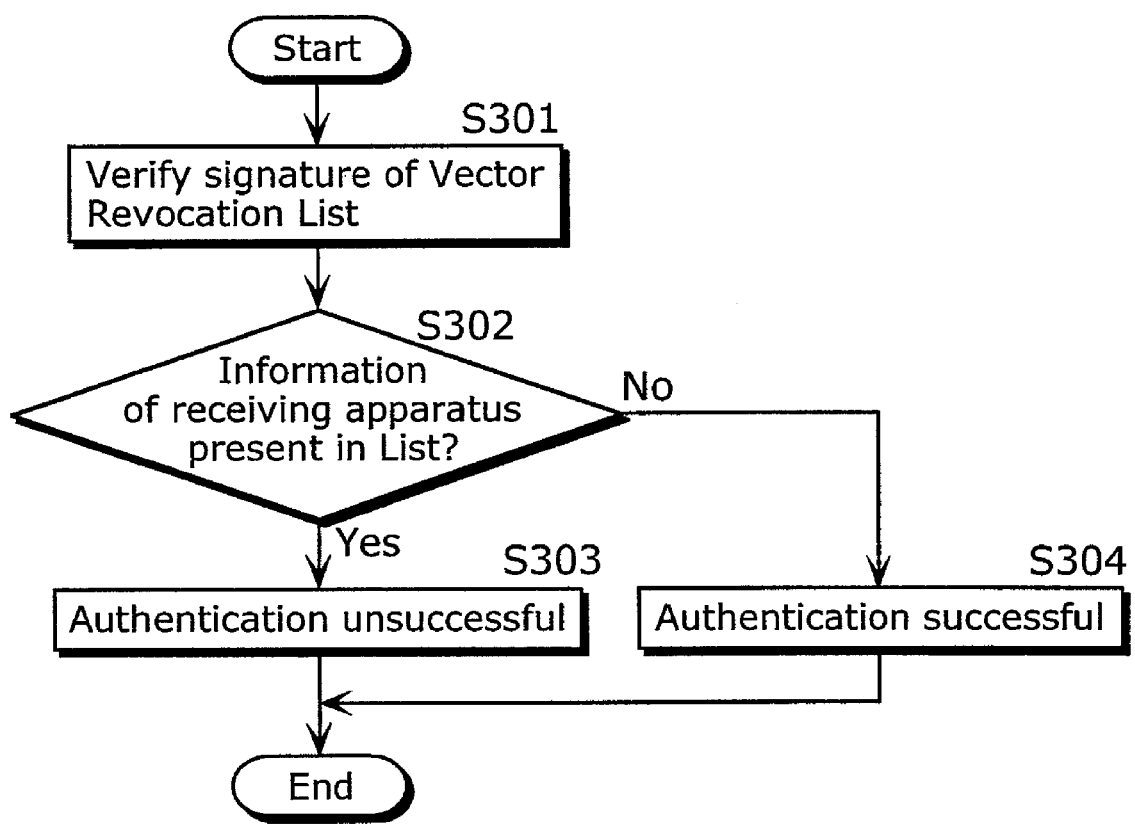
FIG. 10 is a flowchart showing a process flow of apparatus verification performed by the audio-video communication system according to the embodiment of the present invention.

FIG. 10 is a flowchart showing a process flow of the apparatus verification (S111) performed by the audio-video communication system 100 according to the embodiment of the present invention. As shown in FIG. 10, the apparatus verifying unit 118 first verifies a signature included in the updated Vector Revocation List (S301). More specifically, the apparatus verifying unit 118 verifies whether or not the signature included in the Vector Revocation List, that is held in the Vector Revocation List area 153 and has been updated in S110, is valid. Although not shown in FIG. 10, when the signature of the Vector Revocation List is invalid, the authentication process is abnormally ended or a process, such as reacquisition of the Vector Revocation List, is performed. When it is judged that the Vector Revocation List is valid in S301, the apparatus verifying unit 118 judges whether or not the Bksv information held in the Bksv area 151 of the memory area 113 is present in the updated Vector Revocation List which is held in the Vector Revocation List area 153 (S302). It should be noted here that when one or more receiving apparatuses are connected to the receiving apparatus 120 which is in turn connected to the sending apparatus 110, in other words, when the second authentication is performed in S105, the apparatus verifying unit 118 further judges whether or not the apparatus-unique information included in the KSV List information held in the KSV List information area 152 is present in the updated Vector Revocation List held in the Vector Revocation List area 153.

When the held Bksv information, or the apparatus-unique information included in the KSV List information, is present in the updated Vector Revocation List (Yes in S302), the apparatus verifying unit 118 judges that the receiving apparatuses 120 are unauthorized apparatuses (S303). On the other hand, when the held Bksv information, or the apparatus-unique information included in the KSV List information, is not present in the updated Vector Revocation List (No in S302), the apparatus verifying unit 118 judges that the receiving apparatuses 120 are authorized apparatuses (S304).

Again, referring back to FIG. 6, when the apparatus verification is unsuccessful (NG in S111), the sending apparatus 110 abandons the Bksv information, or the KSV List information, held in the memory area 113 (S112), and then abnormally ends the content transmission.

Meanwhile, when the Vector Revocation List acquired in S108 is older than the one held in the memory area 113 (No in S109), the Vector Revocation List is not updated.

According to the embodiment of the present invention as described so far, when the Vector Revocation List is updated, the apparatus verifying unit 118 of the sending apparatus 110 in the audio-video communication system 100 performs the apparatus verification using the updated Vector Revocation List. This can prevent blackout, which has been caused in the case of the conventional audio-video communication system whereby the first and second authentications are once again performed using the updated Vector Revocation List. To be more specific, the sending apparatus 110 according to the embodiment of the present invention can perform the apparatus authentication process without causing blackout.

Moreover, the sending apparatus 110 according to the embodiment of the present invention performs the process to update the Vector Revocation List acquired from the playback medium or the like, in parallel with the third authentication process (S106). Also, the sending apparatus 110 performs the apparatus verification using the updated Vector Revocation List, in parallel with the third authentication process (S106). This can reduces a delay in executing the third authentication process, which is caused due to the execution of the apparatus verification process. Accordingly, as compared with the case of the conventional sending apparatus, the sending apparatus 110 according to the embodiment of the present invention can speedily perform the apparatus verification process and the third authentication process. Additionally, with each updating of the Vector Revocation List, the information regarding unauthorized apparatuses included in the Vector Revocation List increases. This increase in turn results in an increase in the amount of process for each of the first and second authentications. More specifically, the processing time for the apparatus verification process performed after the Vector Revocation List is updated, that is, the processing time for each of the conventional first and second authentications, takes longer. As a consequence, a period of time of blackout caused by the conventional sending apparatus may last longer. Here, in other words, the present invention can be more effective in responding to a longer processing time taken for the apparatus verification process.

Moreover, the signature verification for the Vector Revocation List (S203, S210, S301, and S603) performed in the apparatus verification process, included in the conventional first and second authentications, needs a large amount of process and its processing time is long. In the case of the sending apparatus 110 according to the embodiment of the present invention, when the Vector Revocation List is updated, the apparatus verifying unit 118 verifies the signature included in the updated Vector Revocation List (S301) in parallel with the third authentication process performed by the authenticating unit 115 (S106). This can reduce a delay in executing the third authentication process, the delay being caused due to the execution of the apparatus verification process. Accordingly, the apparatus verification process and the third authentication process can be speedily performed.

Furthermore, the sending apparatus 110 according to the embodiment of the present invention have the memory area 113 keep the apparatus-unique information of the receiving apparatus 120 that is acquired in the first authentication (S102) and the second authentication (S105), even after the end of the first and second authentications. For this reason, when the Vector Revocation List is updated so that the apparatus verification process has to be performed once again, the apparatus-unique information of the receiving apparatus 120 does not need to be reacquired. On the other hand, after the Vector Revocation List is updated in the conventional case (S509), the conventional sending apparatus 510 needs to reacquire the information about the receiving apparatus 520 in the first authentication (S502) and the second authentication (S505). This is to say, the sending apparatus 110 according to the embodiment of the present invention can reduce the amount of process needed when the Vector Revocation List is updated so that the apparatus verification process has to be once again performed.

Also, when the plurality of the receiving apparatuses 120 are connected, the sending apparatus 110 according to the embodiment of the present invention acquires the respective pieces of apparatus-unique information of the plurality of the receiving apparatuses 120 in the second authentication process (S105). When the Vector Revocation List is updated, the apparatus verifying unit 118 performs the apparatus verification by checking whether or not the apparatus-unique information of these receiving apparatuses 120 is present in the updated Vector Revocation List. This means that, in the case where a repeater, a hub, or the like is used for the sending apparatus 110 to which a plurality of HDMI apparatuses are connected, the present invention can also prevent blackout from occurring.

In the above description, the third authentication process (S106) is performed in parallel with the updating of the Vector Revocation List and the apparatus verification (S108 to S112). However, the third authentication process and part of the respective processes included in the updating of the Vector Revocation List and the apparatus verification (S108 to S112) may be performed on a time series.

Moreover, the authenticating unit 115 for performing the first and second authentications and the apparatus verifying unit 118 are described as separate functional blocks in FIG. 5. However, part of the processes included in the first authentication process (S102), the second authentication process (S105), and the apparatus verification process (S111) may be executed using a common piece of hardware.

Furthermore, in the above description, the sending apparatus 110 reads the audio and video data from a DVD medium or the like, and outputs the read data to the receiving apparatus 120. However, the sending apparatus 110 may output the content downloaded via the Internet, to the receiving apparatus. Or, the sending apparatus 110 may output either one of the audio data and the video data. Although described as a DVD player in the above explanation, the sending apparatus 110 may be an AV apparatus, or an audio-video processing system, such as a DVD recorder, a Blu-ray apparatus, an STB (Set-Top Box), or an HD (Hard Disk) movie camera. Alternatively, the sending apparatus 110 may be a personal computer or the like.

In the above description, the mute setting is cancelled (S103) after the end of the first authentication and before the start of the second authentication. However, the mute setting may be cancelled: after the end of the second authentication; after the end of a first round of the third authentication; or after the third authentication is performed a predetermined number of times.

Although the apparatus-unique information of the receiving apparatus 120 is abandoned (S112) after the apparatus verification is ended unsuccessfully (NG in S111) in the above description, the information may be abandoned at a different timing. For example, the apparatus-unique information of the receiving apparatus 120 may be abandoned when the connection configuration is changed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to an audio-video output apparatus, an authentication processing method, and an audio-video processing system, and in particular to a DVD apparatus, a Blu-ray apparatus, an STB, an HD movie camera, a personal computer, and the like which have audio-video output functions using HDMI communications.

What is claimed is:

1. An audio-video output apparatus which outputs at least one of audio data and video data to a receiving apparatus using High-Definition Multimedia Interface (HDMI) communications, said audio-video output apparatus comprising:
   a list storage configured to hold an unauthorized apparatus list which contains information about an unauthorized apparatus;
   an authenticator, embodied in a processor, configured to perform a first apparatus authentication to verify whether or not the receiving apparatus is an authorized apparatus using the unauthorized apparatus list stored in said list storage, and to perform a second apparatus authentication at regular intervals to verify the receiving apparatus is an authorized apparatus;
   a list acquirer, embodied in a processor, configured to acquire another unauthorized apparatus list;
   an updater, embodied in a processor, configured to update the unauthorized apparatus list stored in said list storage to the unauthorized apparatus list acquired by said list acquirer when the unauthorized apparatus list acquired by said list acquirer is newer than the unauthorized apparatus list stored in said list storage; and
   an apparatus verifier, embodied in a processor, configured to, when the unauthorized apparatus list is updated by said updater, verify whether or not the receiving apparatus is an authorized apparatus using the updated unauthorized apparatus list, the verification being performed in parallel with the second apparatus authentication performed by said authenticator.

2. The audio-video output apparatus according to claim 1 further comprising:
   an apparatus information acquirer, embodied in a processor, configured to acquire apparatus-unique information of the receiving apparatus when the first apparatus authentication is performed; and
   an apparatus information storage configured to hold the apparatus-unique information of the receiving apparatus acquired by said apparatus information acquirer,
   wherein, when the apparatus-unique information stored in said apparatus information storage is not present in the unauthorized apparatus list stored in the list storage, said authenticator is operable to judge that the receiving apparatus is an authorized apparatus in the first apparatus authentication, and
   when the apparatus-unique information acquired in the first apparatus authentication and stored in the apparatus information storage is not present in the unauthorized apparatus list updated by said updater and stored in the list storage, said apparatus verifier is operable to judge that the receiving apparatus is an authorized apparatus.

3. The audio-video output apparatus according to claim 1, wherein said apparatus verifier includes
   a signature verifier, embodied in a processor, configured to, when the unauthorized apparatus list is updated by said updater, verify whether or not signature information included in the updated unauthorized apparatus list is valid, the verification being performed in parallel with the second apparatus authentication performed by said authenticator.

4. The audio-video output apparatus according to claim 1, wherein said list acquirer is operable to acquire the unauthorized apparatus list in parallel with the second apparatus authentication performed by said authenticator, and
   said updater is operable to update the unauthorized apparatus list stored in the list storage to the unauthorized apparatus list acquired by said list acquirer when the unauthorized apparatus list acquired by said list acquirer is newer than the unauthorized apparatus list stored in the list storage, the updating being performed in parallel with the second apparatus authentication performed by said authenticator.

5. The audio-video output apparatus according to claim 1, wherein the first and second apparatus authentications performed on the receiving apparatus by said authenticator are defined by High-bandwidth Digital Content Protection (HDCP) standard,
   the first apparatus authentication includes first and second authentications defined by the HDCP standard, and
   the second apparatus authentication includes a third authentication defined by the HDCP standard.

6. An audio-video processing system which outputs at least one of audio data and video data to a receiving apparatus using High-Definition Multimedia Interface (HDMI) communications, said audio-video output system comprising:
   a list storage configured to hold an unauthorized apparatus list which contains information about an unauthorized apparatus;
   an authenticator, embodied in a processor, configured to perform a first apparatus authentication to verify whether or not the receiving apparatus is an authorized apparatus using the unauthorized apparatus list stored in said list storage, and to perform a second apparatus authentication at regular intervals to verify the receiving apparatus is an authorized apparatus;
   a list acquirer, embodied in a processor, configured to acquire another unauthorized apparatus list;
   an updater, embodied in a processor, configured to update the unauthorized apparatus list stored in said list storage to the unauthorized apparatus list acquired by said list acquirer when the unauthorized apparatus list acquired by said list acquirer is newer than the unauthorized apparatus list stored in said list storage;
   an apparatus verifier, embodied in a processor, configured to, when the unauthorized apparatus list is updated by said updater, verify whether or not the receiving apparatus is an authorized apparatus using the updated unauthorized apparatus list, the verification being performed in parallel with the second apparatus authentication performed by said authenticator;
   a data processor configured to read at least one of the audio data and the video data from a recording medium and to process the read data; and
   an outputter, embodied in a processor, configured to output the data processed by said data processor to the receiving apparatus using the HDMI communications.

7. An authentication processing method for an audio-video output apparatus which outputs at least one of audio data and video data to a receiving apparatus using High-Definition Multimedia Interface (HDMI) communications and includes a list storage configured to hold an unauthorized apparatus list which contains information about an unauthorized apparatus, the authentication processing method comprising:
   performing a first apparatus authentication to verify whether or not the receiving apparatus is an authorized apparatus using the unauthorized apparatus list stored in the list storage;
   acquiring another unauthorized apparatus list;
   updating the unauthorized apparatus list stored in the list storage to the unauthorized apparatus list acquired in the acquiring when the unauthorized apparatus list acquired in the acquiring is newer than the unauthorized apparatus list stored in the list storage; and verifying, when the unauthorized apparatus list is updated in the updating, whether or not the receiving apparatus is an authorized apparatus using the updated unauthorized apparatus list, the verifying being performed in parallel with a second apparatus authentication performed at regular intervals to verify whether or not the receiving apparatus is an authorized apparatus.

8. The audio-video output apparatus according to claim 1, wherein the first apparatus authentication is performed, while the at least one of audio data and video data is set on mute so that the receiving apparatus does not present the at least one of audio data and video data.

9. The audio-video output apparatus according to claim 1, wherein the second apparatus authentication is performed, after the first apparatus verification verifies that the receiving apparatus is an authorized apparatus.

10. The audio-video output apparatus according to claim 9, wherein when the first apparatus verification verifies that the receiving apparatus is an authorized apparatus, the audio-video output apparatus starts outputting the at least one of the audio data and video data to the receiving apparatus in visible or audible form, and
the second apparatus authentication performed by the authenticator and the verification performed by the apparatus verifier are performed in parallel, while the at least one of audio data and video data is being presented in the receiving apparatus.

11. The audio-video output apparatus according to claim 9, wherein the second apparatus authentication does not use the unauthorized apparatus list.

12. The authentication processing method according to claim 7, wherein the second apparatus authentication being performed when the first apparatus authentication verifies that the receiving apparatus is an authorized apparatus.

13. The authentication processing method according to claim 12, further comprising:
   starting outputting of at least one of the audio data and video data to the receiving apparatus in visible or audible form, when the first apparatus verification verifies that the receiving apparatus is an authorized apparatus, and
   wherein the second apparatus authentication and the verifying are performed in parallel, while the at least one of audio data and video data is being presented in the receiving apparatus.

* * * * *